(12) United States Patent
Hope (10) Patent No.: US 12,385,267 B2
(45) Date of Patent: Aug. 12, 2025

(54) DEFORMABLE SURFACE PATCH UNIT

(71) Applicant: D.P. Wagner, LLC, Rogers, AR (US)

(72) Inventor: Kenyon Chayce Hope, Hiram, GA (US)

(73) Assignee: D.P. Wagner, LLC, Rogers, AR (US)

( * ) Notice: Subject to any disclaimer, the term of this patent is extended or adjusted under 35 U.S.C. 154(b) by 272 days.

(21) Appl. No.: 18/187,808

(22) Filed: Mar. 22, 2023

(65) Prior Publication Data

US 2024/0318444 A1    Sep. 26, 2024

(51) Int. Cl.
*E04G 23/02*    (2006.01)
(52) U.S. Cl.
CPC ................. *E04G 23/0214* (2013.01)
(58) Field of Classification Search
CPC ..... E04G 23/00; E04G 23/02; E04G 23/0203; E04G 23/0214; E04G 23/0211
See application file for complete search history.

(56) References Cited

U.S. PATENT DOCUMENTS

| | | | | |
|---|---|---|---|---|
| 4,135,017 A * | 1/1979 | Hoffmann, Sr. | ......... | E04G 23/02 |
| | | | | 52/514 |
| 5,620,768 A * | 4/1997 | Hoffmann, Sr. | ......... | B32B 15/02 |
| | | | | 52/514 |
| 5,640,820 A * | 6/1997 | Wood | ....................... | H02G 3/12 |
| | | | | 52/514 |
| 5,839,241 A * | 11/1998 | Cacossa | .................. | E04F 13/06 |
| | | | | 52/287.1 |
| 6,746,741 B2 * | 6/2004 | Wheatley | ............ | E04G 23/0214 |
| | | | | 428/41.5 |
| 6,846,537 B2 * | 1/2005 | Wheatley | ............ | E04G 23/0218 |
| | | | | 428/41.5 |
| 7,306,851 B2 | 12/2007 | Panse | | |
| 7,380,382 B2 * | 6/2008 | Hansen | ............... | E04G 23/0203 |
| | | | | 52/514 |
| 7,971,405 B2 * | 7/2011 | Hansen | ................. | E04F 13/047 |
| | | | | 52/514 |
| 8,281,538 B2 | 10/2012 | Waters | | |
| 8,367,569 B2 * | 2/2013 | Wheatley | ................ | C04B 28/02 |
| | | | | 442/314 |

(Continued)

OTHER PUBLICATIONS bbuy.com, "Naturehike Self-Adhesive TPU Gear Repair Patch Kit" available at "https://us.obuy.com/naturehike-tpu-gear-repair-patch-kit-3-pieces", 2 Pages.

(Continued)

*Primary Examiner* — Chi Q Nguyen
(74) *Attorney, Agent, or Firm* — Jeremy Briggs (57) ABSTRACT

A surface repair patch unit is disclosed. The patch unit may include a deformable Thermoplastic Polyurethane (TPU) sheet and a deformable adhesive mesh sheet. The deformable adhesive mesh sheet may be attached or fused to the TPU sheet such that the TPU sheet may be disposed on a mesh sheet interior surface. The patch unit may be configured to be adhered to a damaged surface via the deformable adhesive mesh sheet, and the TPU sheet may substantially cover the damaged surface. The patch unit may further include a first protective film and a second protective film that may be removably attached to patch unit opposing surfaces, and may protect the opposing surfaces from ambient environment.

19 Claims, 5 Drawing Sheets

(56) References Cited

U.S. PATENT DOCUMENTS

| | | | |
|---|---|---|---|
| 8,381,474 B2* | 2/2013 | Lewis | E04G 23/0207 |
| | | | 52/746.1 |
| 8,511,029 B2* | 8/2013 | Hansen | E04G 23/0203 |
| | | | 52/746.1 |
| 8,808,479 B2 | 8/2014 | Hood | |
| 2006/0191237 A1* | 8/2006 | Hansen | E04F 13/04 |
| | | | 52/746.1 |
| 2007/0087151 A1* | 4/2007 | Hoffmann | E04G 23/0203 |
| | | | 428/40.1 |

OTHER PUBLICATIONS

Plastics Today Community for Plastics Professionals "TPU with a memory opens up new application areas" available at "https://www.plasticstoday.com/tpu-memory-opens-new-application-areas", May 23, 2012, 4 Pages.

* cited by examiner

DEFORMABLE SURFACE PATCH UNIT

TECHNICAL FIELD

The present disclosure relates to a surface patch unit, and more specifically to a flexible surface patch unit having a deformable Thermoplastic Polyurethane (TPU) sheet that may be adhered to surfaces of different shapes.

BACKGROUND

Drywalls or surfaces made of wood, fiberglass or board generally get damaged due to wear and tear and regular usage. Users may replace affected surface with a new surface when the damage is substantial. However, in most cases, the damage due to wear and tear is reparable, and the users typically use surface repair patches to repair the damage, and/or apply drywall compound (e.g., cement or quickset plaster) over the damaged surface portion.

A conventional drywall repair patch uses a metal plate that may be adhered to the drywall over the damaged portion by using an adhesive mesh material. A user may apply the drywall compound over the metal plate when the patch is adhered to the drywall, thus enabling repair of damaged portion.

While the metal plate may provide strength and structural integrity to the repair patch, the metal plate is generally not flexible, and hence cannot be used to repair damages on curved surfaces or drywall corners. Further, the metal plate typically has a different coefficient of thermal expansion than respective coefficients of the adhesive mesh material and/or drywall material. Thus, the metal plate may expand or contract at a different rate than the adhesive mesh and the drywall, when the repair patch heats or cools due to fluctuations in ambient temperature. This may result in cracking of repaired drywall portion over time.

Furthermore, repair patches with metal plates typically have standard/fixed dimensions and may not be customized. Therefore, such repair patches may have limited utility in repairing damaged drywall portions of different dimensions. For example, a conventional metal plate-based repair patch of square shape may not be useful in repairing an elongated damaged drywall portion (e.g., along a length of a drywall corner).

Thus, there is a need for a surface repair patch that may be customizable, flexible and may not develop cracks over time.

It is with respect to these and other considerations that the disclosure made herein is presented.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure is directed towards a flexible patch unit that may be adhered to a surface. The patch unit may be, for example, a surface repair patch unit that may be adhered over a damaged portion (e.g., a crack or a hole) of a drywall. A user may apply drywall compound over the patch unit after adhering the patch unit to the drywall surface. In some aspects, the patch unit may include a deformable Thermoplastic Polyurethane (TPU) sheet and a deformable adhesive mesh sheet. The TPU sheet may be attached to the adhesive mesh sheet, and the patch unit may be adhered to the drywall surface via the adhesive mesh sheet. The TPU sheet may substantially cover the damaged portion when the user adheres the patch unit to the drywall surface.

In other aspects, the TPU sheet and the adhesive mesh sheet may be fused together during patch unit manufacturing process to form an integrated unified sheet. In this case, one surface (e.g., an interior surface) of the integrated unified sheet may include adhesive material, and the integrated unified sheet may be adhered to the drywall surface via the interior surface. Further, an opposing surface (e.g., an exterior surface) of the integrated unified sheet may be non-adhesive, and the user may apply drywall compound over the exterior surface when the integrated unified sheet is adhered to the drywall surface over the damaged portion.

In another aspect, the patch unit may include the TPU sheet, but may not include the adhesive mesh sheet. In this case, a TPU sheet interior surface may include the adhesive material, and the user may directly adhere the TPU sheet to the drywall surface via the TPU sheet interior surface. In this case, a TPU sheet exterior surface may be non-adhesive, and the user may apply the drywall compound over the TPU sheet exterior surface when the TPU sheet is adhered to the drywall surface.

In yet another aspect, the patch unit may include the TPU sheet and a textile sheet. In this case, both the TPU sheet exterior and interior surfaces may include adhesive material, and the textile sheet may be attached to the TPU sheet exterior surface. The textile sheet may have greater thickness than TPU sheet thickness, and the patch unit including the textile sheet may act as a childproof surface patch that may be adhered to drywall surface portions that may be more prone to impacts (e.g., surface corners). In further aspects, the patch unit may include additional reinforcement layers (e.g., of plastic or fiberglass) in between the TPU sheet and the textile sheet to increase patch unit thickness and provide additional cushion to the childproof surface.

The present disclosure discloses a patch unit that may enable the user to repair a damaged surface portion. Since the patch unit is made of flexible sheets, the patch unit may be adhered to curved surfaces or corners. Further, since the patch unit includes the TPU sheet that may have a low coefficient of thermal expansion, the patch unit may not expand (or contract) considerably when ambient temperature fluctuates. This may ensure that repaired surface portion (including the patch unit) may not develop cracks over time. Further, the patch unit may have customizable dimensions and the user may conveniently cut the patch unit to a desired dimension by using a pair of scissors. This may enable the user to use the patch unit to repair damaged portions of varying shapes and dimensions.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

Figure 1:
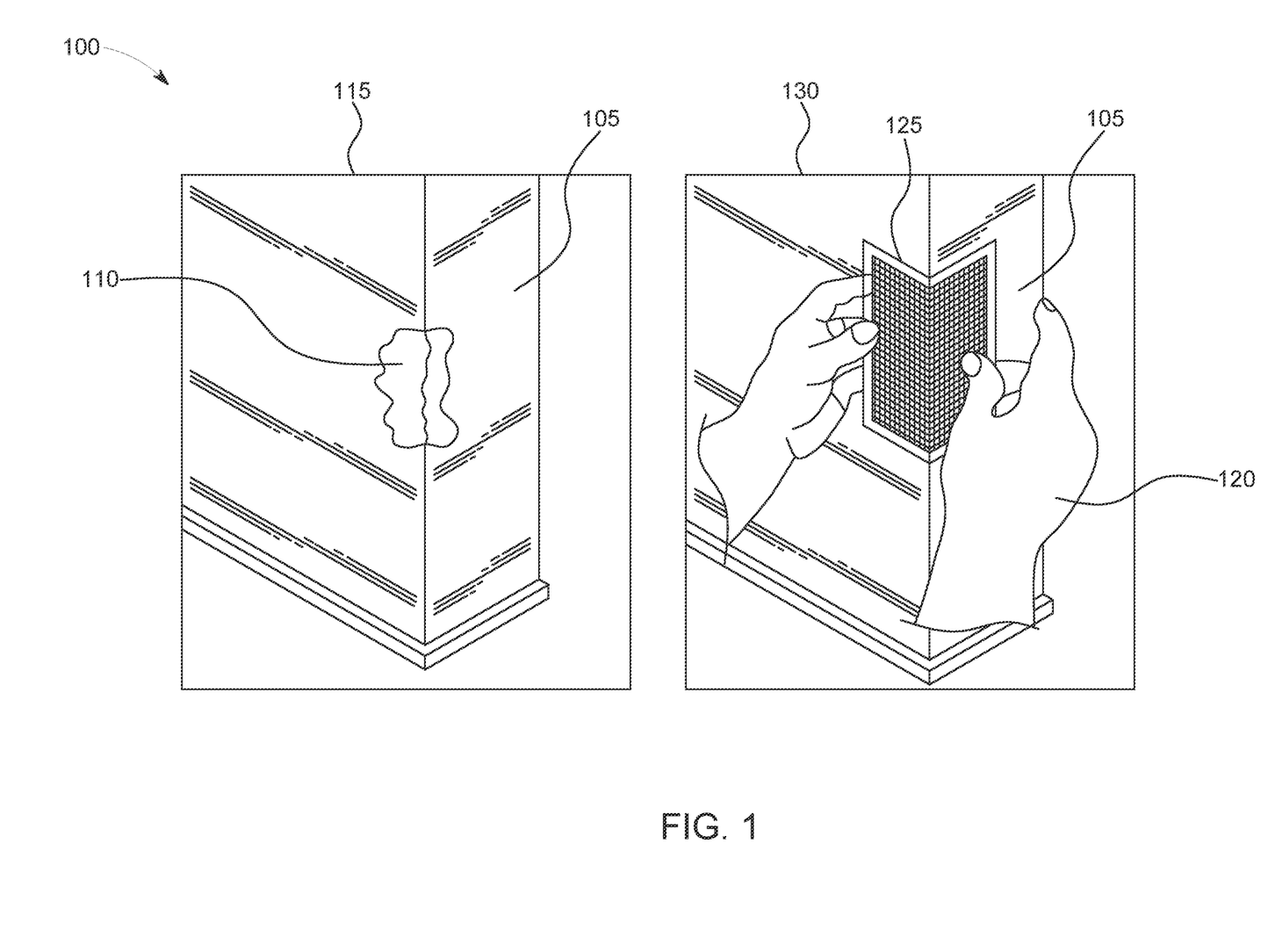
FIG. 1 depicts an example environment in which techniques and structures for providing the systems and methods disclosed herein may be implemented.

FIG. 1 depicts an example environment 100 in which techniques and structures for providing the systems and methods disclosed herein may be implemented. The environment 100 may include a surface 105 that may a drywall, a wooden surface, a furniture surface, a plastic surface, a glass surface, a fiberglass surface, a board, and/or the like. The surface 105 may include a damaged portion 110 that may require repair, shown in view 115 of FIG. 1.

The surface 105 may develop the damaged portion 110 due to wear and tear, or when the surface 105 experiences an impact. For example, if the surface 105 is a drywall, the surface 105 may develop the damaged portion 110 over time, for example, when users place their hands on the drywall repeatedly or when objects (e.g., furniture, painting, electric appliances, etc.) are affixed on or in proximity to the surface 105. As another example, the surface 105 may develop the damaged portion 110 when an object (e.g., a hammer, a toy, etc.) accidentally hits or impacts the surface 105.

In some aspects, the damaged portion 110 may include a worn area, a hole and/or a torn area, and may be of any shape and size. Further, the damaged portion 110 may be located at a surface corner edge (as shown in FIG. 1), or may be located on a surface flat portion (e.g., top portion, bottom portion, and/or side portion).

A user 120 may repair the damaged portion 110 by adhering a surface repair patch unit 125 on the surface 105 (specifically over the damaged portion 110), and then applying a drywall compound (not shown) over a surface repair patch unit 125 exterior surface. The surface repair patch unit 125 is shown in view 130 of FIG. 1.

The user 120 may be a professional construction worker or a homeowner (or a homeowner's family member). Stated another way, the user 120 may not require professional construction expertise or skills to repair the damaged portion 110 by using the surface repair patch unit 125.

The drywall compound that may be applied over the surface repair patch unit 125 exterior surface may include, for example, any putty, spackle, mud, joint compound, plastic, resin, plaster, veneer plaster, plaster of paris, or other mixture of water, limestone, expanded perlite, ethylene-vinyl acetate polymer, gypsum, and/or attapulgite. The user 120 may also apply paint (e.g., of same color as surface 105 color) over the drywall compound to make an appearance of repaired portion same or equivalent as surface 105 appearance.

The surface repair patch unit 125 may be made of one or more flexible or deformable sheets, and may include an adhesive interior surface (not shown). The surface repair patch unit 125 may be adhered to the surface 105 via the adhesive interior surface. Further, since the surface repair patch unit 125 is made of flexible/deformable sheets, the surface repair patch unit 125 may be adhered to curved surfaces or corners of drywalls (as shown in FIG. 1), as well as flat surface portions. In this manner, the surface repair patch unit 125, as described in the present disclosure, provides an advantage over conventional metal plate-based repair patches that may not be flexible, and hence may not have utility in repairing curved surfaces and/or drywall corners.

In further aspects, the surface repair patch unit 125 may be thin (e.g., may have a thickness in a range of 0.05 to 0.2 centimeters), and hence may not visibly protrude from the surface 105 when the surface repair patch unit 125 is adhered to the surface 105. Furthermore, the surface repair patch unit 125 may be customizable in shape and dimension, and hence may be applied to damaged portions of different lengths or widths. For example, the user 120 may customize surface repair patch unit 125 dimensions based on damaged portion 110 dimensions, by cutting the surface repair patch unit 125 using a pair of scissors. In this manner, the surface repair patch unit 125 provides an additional advantage over conventional metal plate-based repair patches that may be rigid and of standard size, and hence may not be customizable.

Furthermore, the surface repair patch unit 125 may be made of one or more sheets that may have lower coefficient of thermal expansion than metal plate-based surface repair patches. Stated another way, the surface repair patch unit 125 may not expand (or contract) considerably, as compared to metal plate-based surface repair patches, when the surface repair patch unit 125 is heated (or cooled). Thus, the surface repair patch unit 125 may not develop cracks on repaired drywall portion over time, due to fluctuations in ambient temperature.

The surface repair patch unit 125 may also have low modulus of elasticity, so that the user 120 may conveniently stretch (if required) the surface repair patch unit 125. The surface repair patch unit 125 may also have "memory", such that the surface repair patch unit 125 may return to its original shape after the surface repair patch unit 125 is stretched. For example, if the user 120 "presses inwards" the surface repair patch unit 125 into a hole (e.g., the damaged portion 110) after adhering the surface repair patch unit 125 over the hole, the surface repair patch unit 125 may return to its original shape after the user 120 releases pressing force.

Structural and functional details of the surface repair patch unit 125 are described below in detail in conjunction with subsequent figures.

Figure 2:
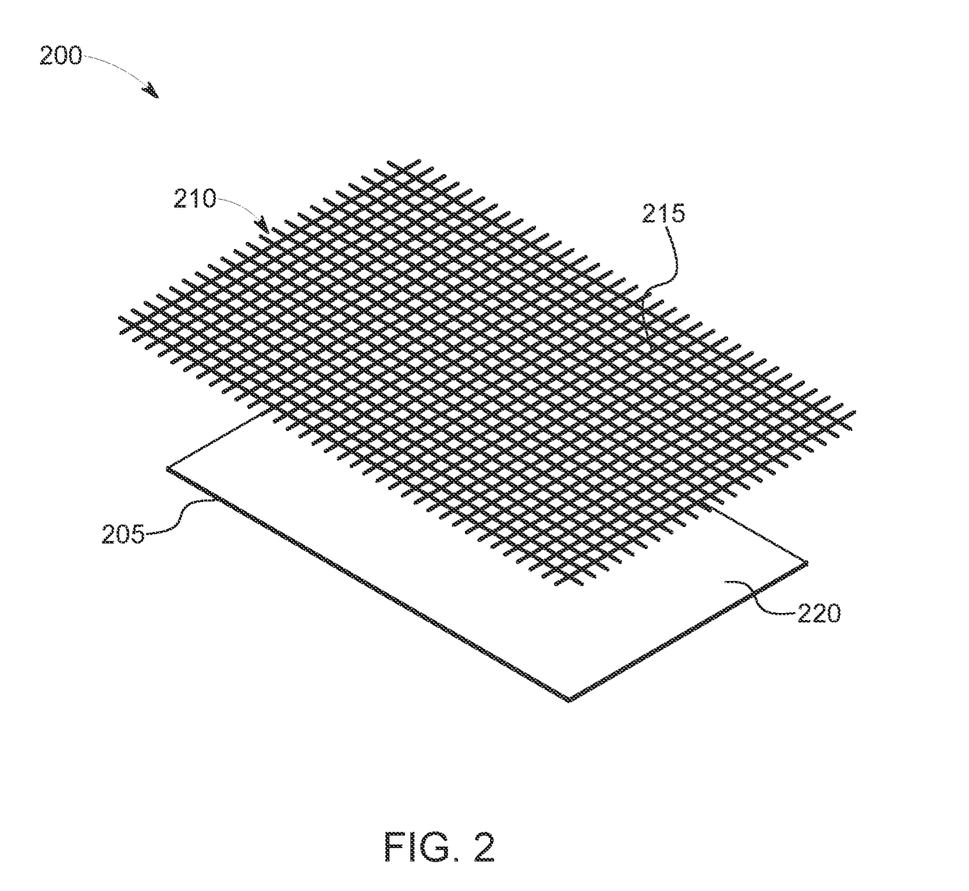
FIG. 2 depicts an example surface repair patch unit in accordance with the present disclosure.

FIG. 2 depicts an example surface repair patch unit 200 in accordance with the present disclosure. The surface repair patch unit 200 may be same as the surface repair patch unit 125 described in conjunction with FIG. 1. While describing FIG. 2, references may be made to FIGS. 3A and 3B.

The surface repair patch unit 200 may include a deformable sheet 205 (e.g., a deformable first sheet) and a deformable mesh sheet 210 (e.g., a deformable second sheet). In some aspects, the deformable sheet 205 may have a lower coefficient of thermal expansion than respective coefficients of thermal expansion of the deformable mesh sheet 210 and the surface 105. In a preferred aspect, the deformable sheet 205 may be made of Thermoplastic Polyurethane (TPU). In other aspects, the deformable sheet 205 may be made of any other thermoplastic polyester, for example, Polylactic acid or Polylactide (PLA). Hereinafter, the deformable sheet 205 is referred to as TPU sheet 205.

Since the TPU sheet 205 may have a low coefficient of thermal expansion, the TPU sheet 205 may not expand (or contract) considerably when there are fluctuations in temperature. For example, the TPU sheet 205 may not considerably expand when the TPU sheet 205 is heated due to changes in ambient temperature. In an exemplary aspect, the TPU sheet 205 may have a coefficient of thermal expansion in a range of 10 to 30 μm/m·K (or $10^{-6}$/K) across a wide range of temperature spectrum, e.g., from −50 to +125 degree Celsius.

Further, the TPU sheet 205 may have a low modulus of elasticity, and hence may be easily stretched or deformed. In an exemplary aspect, the TPU sheet 205 may have a modulus of elasticity in a range of 0.005 to 0.3 gigapascals (GPa). Further, the TPU sheet 205 may have a "memory", such that the TPU sheet 205 may return to its original shape when the TPU sheet 205 is deformed, as described in conjunction with FIG. 1.

In further aspects, the TPU sheet 205 may be thin, having a uniform thickness in a range of 0.025 to 0.1 centimeter. Since the TPU sheet 205 is thin, the TPU sheet 205 is light in weight, easy to carry and may be easily cut by a pair of scissors to customize TPU sheet 205 dimensions (length and/or width).

A person ordinarily skilled in the art may appreciate that the example thickness and numerical values of coefficients described above are not intended to be limiting, and the TPU sheet 205 may have different dimensions and/or coefficients, without departing from the present disclosure scope.

In accordance with an exemplary embodiment of the present disclosure, the deformable mesh sheet 210 may be a flat woven sheet made of fibrous material including, but not limited to, carbon nanofibers, carbon fiber, spandex, chopped fiber, fiber mat, fiberglass, textile, and/or the like. In a preferred aspect, the deformable mesh sheet 210 is made of fiberglass.

The deformable mesh sheet 210 may include a mesh sheet exterior surface 215 and a mesh sheet interior surface (not shown) opposite to the mesh sheet exterior surface 215. In some aspects, the deformable mesh sheet 210 may be an adhesive deformable mesh sheet that may be configured to be adhered to the TPU sheet 205 and the surface 105. Specifically, the mesh sheet interior surface may include adhesive material (e.g., industrial grade adhesive), such that the deformable mesh sheet 210 (hereinafter referred to as deformable adhesive mesh sheet 210) may be configured to be adhered to a TPU sheet first (exterior) surface 220 that may face the mesh sheet interior surface. The mesh sheet interior surface may further enable the user 120 to adhere the surface repair patch unit 200 to the surface 105.

In some aspects, the deformable mesh sheet 210 may also be thin, and may have a thickness equivalent to TPU sheet thickness. In further aspects, deformable adhesive mesh sheet 210 length and/or width may be greater than TPU sheet 205 length and/or width. The user 120 may adhere the surface repair patch unit 200 to the surface 105 by using portions of the mesh sheet interior surface that may extend beyond the TPU sheet first surface 220. Specifically, if the TPU sheet 205 has dimensions of 4*4 inch² and the adhesive deformable mesh sheet 210 has dimensions of 5*5 inch², the 1 inch (i.e., 5 inches-4 inches) length and width of the mesh sheet 210 that extends beyond TPU sheet 205 area may be used by the user 120 to adhere the surface repair patch unit 200 to the surface 105.

Figure 3A:
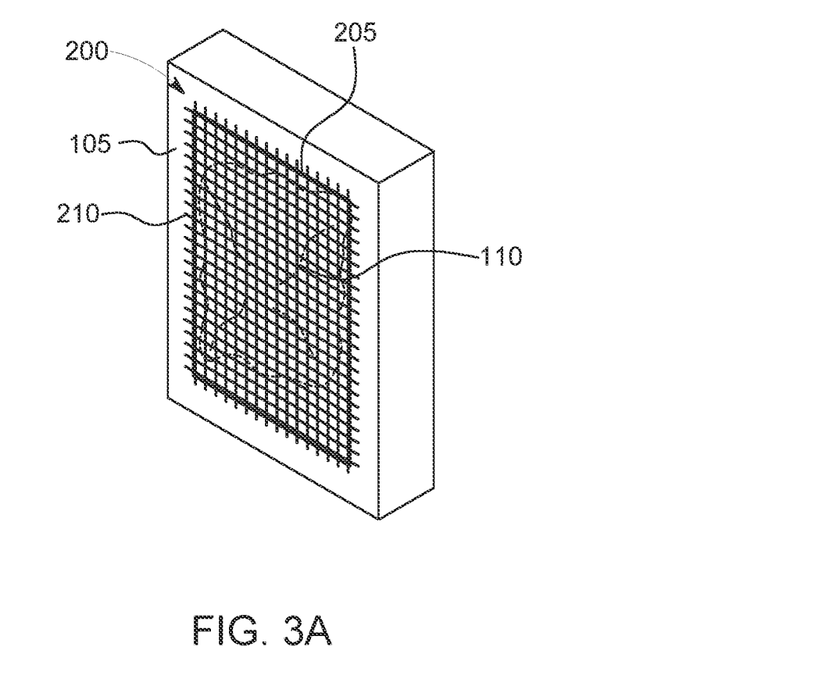
FIG. 3A depicts an isometric view of a surface and the surface repair patch unit of FIG. 2 adhered over the surface, in accordance with the present disclosure.

The mesh sheet interior surface may be adhered (e.g., permanently affixed) to the TPU sheet first surface 220 by using the adhesive material (e.g., during manufacturing of the surface repair patch unit 200). The user 120 may apply the surface repair patch unit 200 to the surface 105 such that the TPU sheet 205 (specifically, a TPU sheet 205 second (interior) surface that is opposite to the TPU sheet first surface 220) substantially covers the damaged portion 110. An example snapshot of the surface repair patch unit 200 adhered to the surface 105 is shown in FIG. 3A. Specifically, FIG. 3A depicts an example isometric view of the surface 105 with the surface repair patch unit 200 adhered over the damaged portion 110. As shown in FIG. 3A, the TPU sheet 205 may substantially cover the damaged portion 110.

As described above in conjunction with FIG. 1, the user 120 may apply drywall compound (and paint) over the surface repair patch unit 200, when the surface repair patch unit 200 is adhered over the damaged portion 110. As shown in FIG. 3A (and described above), the surface repair patch unit 200 may be thin and may not protrude substantially from the surface 105. Further, as described above, the TPU sheet 205 (and hence the surface repair patch unit 200) may have memory, such that the surface repair patch unit 200 may return to its original shape when the user 120 presses or deforms the surface repair patch unit 200.

Figure 3B:
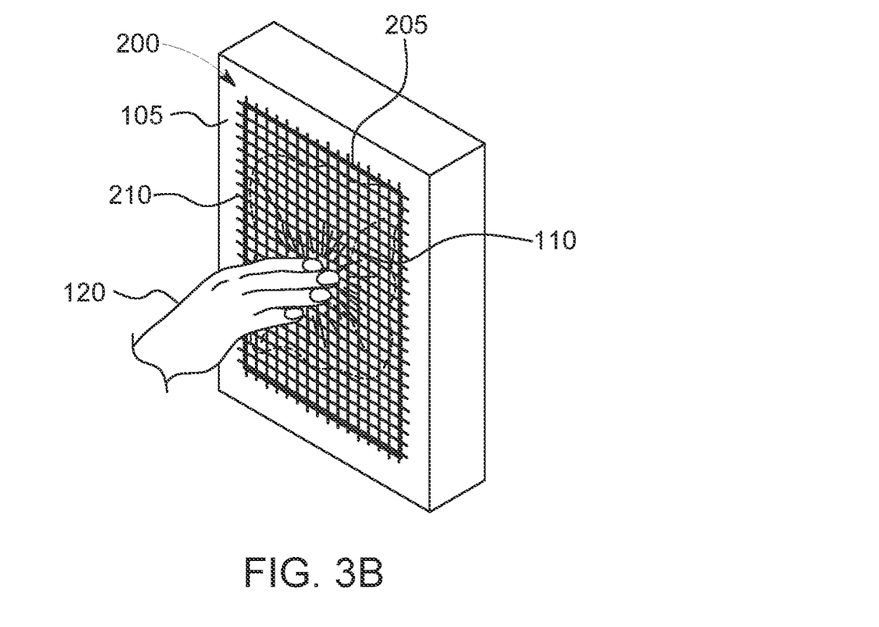
FIG. 3B depicts an example snapshot of a memory feature of the surface repair patch unit of FIG. 2 in accordance with the present disclosure.

FIG. 3B depicts an example snapshot of a surface repair patch unit 200 memory feature in accordance with the present disclosure. As shown in FIG. 3B, the user 120 may press the surface repair patch unit 200 when or after the surface repair patch unit 200 is adhered to the surface 105. The surface repair patch unit 200 may return of its original shape (that may be same as the shape shown in FIG. 3A) after the user 120 releases the pressing force. In this manner, the surface repair patch unit 200 may not develop a permanent dent when the surface repair patch unit 200 experiences an impact.

Although the description above describes that the TPU sheet 205 and the deformable adhesive mesh sheet 210 are two separate sheets that may be adhered to each other (and FIG. 2 too depicts two separate sheets 205 and 210), the present disclosure is not limited to the surface repair patch unit 200 having two separate sheets 205 and 210. In some aspects, the surface repair patch unit 200 may include a unified integrated sheet (shown as unified integrated sheet 415 in FIG. 4) that may be formed by fusing the TPU sheet 205 and the deformable adhesive mesh sheet 210. Specifically, in this case, the deformable adhesive mesh sheet 210 may be fused with the TPU sheet 205 to form the unified integrated sheet during the surface repair patch unit 200 manufacturing process. The deformable adhesive mesh sheet 210 may be fused with the TPU sheet 205 by known fusing techniques, for example, fiberglass molding, hot welding, etc.

The unified integrated sheet may provide more symbiotic relationship between the surface repair patch unit 200 and the surface 105, when the surface repair patch unit 200 is adhered to the surface 105. Specifically, probability of TPU sheet 205 "moving" relative to the deformable adhesive mesh sheet 210 and/or the surface 105 with time may be greatly reduced when the TPU sheet 205 and the deformable adhesive mesh sheet 210 are fused together to form the unified integrated sheet. Further, fusing the TPU sheet 205 and the deformable adhesive mesh sheet 210 may enable manufacturing of a thinner surface repair patch unit, as compared to surface repair patch unit 200 thickness when the surface repair patch unit 200 includes two separates sheets 205 and 210 adhered together using the adhesive material.

In further aspects, when the TPU sheet 205 and the deformable adhesive mesh sheet 210 are fused together to form the unified integrated sheet, the deformable adhesive mesh sheet 210 length and/or width may be same as or equivalent to the TPU sheet 205 length and/or width. In this case, one surface (e.g., a first surface) of the unified integrated sheet may include the adhesive material and the second surface may be non-adhesive. The user 120 may adhere the unified integrated sheet to the surface 105 by using the first surface including the adhesive material. Further, similar to the TPU sheet 205, in this case too, the unified integrated sheet may substantially cover the damaged portion 110.

In another aspect, surface repair patch unit may not include the deformable adhesive mesh sheet 210, and may only include a TPU sheet (e.g., a TPU sheet having a thickness greater than the TPU sheet 205 thickness). In this case, the "thick" TPU sheet may include the adhesive material, and may directly adhere to the surface 105. A surface repair patch unit without a deformable adhesive mesh sheet is described later in the description below in conjunction with FIG. 5.

Figure 4:
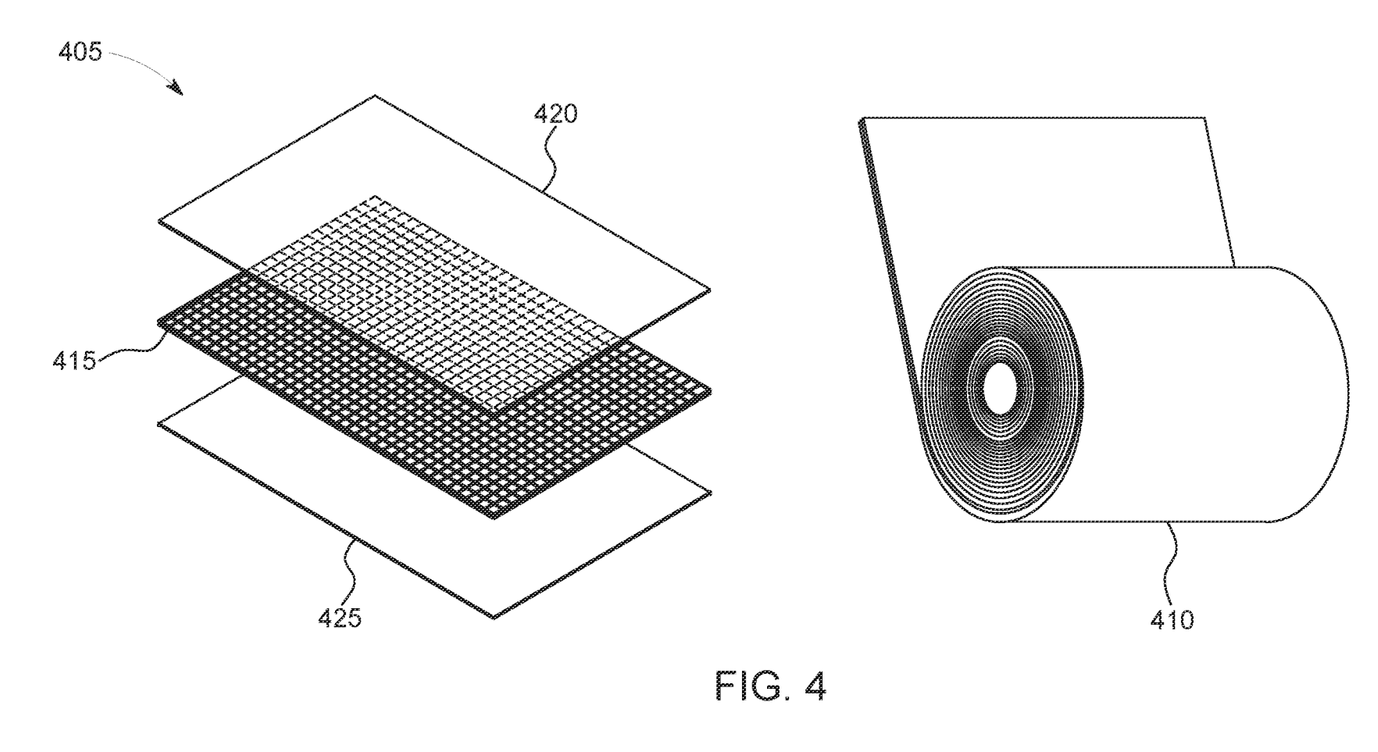
FIG. 4 depicts examples of packaged surface repair patch units in accordance with the present disclosure.

FIG. 4 depicts examples of packaged surface repair patch units in accordance with the present disclosure Specifically, FIG. 4 depicts a surface repair patch unit 405 and a surface repair patch unit roll 410. The surface repair patch unit 405 may be same as the surface repair patch unit 200, and may include a unified integrated sheet 415 that may be formed by fusing the TPU sheet 205 and the deformable adhesive mesh sheet 210.

In an exemplary aspect, the surface repair patch unit 405 may be packaged (and, for example, transported) as a stack of pre-cut multiple surface repair patch units placed one over another. Further, the TPU sheet 205 and the deformable adhesive mesh sheet 210 (and hence the unified integrated sheet 415) may be pre-cut to have a square shape, and may have a length and width in a range of 4 to 8 inches. In a preferred aspect, the TPU sheet 205 and the deformable adhesive mesh sheet 210 (and hence the unified integrated sheet 415) may be square-shaped with dimensions of 4*4 inch$^2$. In other aspects, the TPU sheet 205 and the deformable adhesive mesh sheet 210 (and hence the unified integrated sheet 415) may have dimensions of 6*6 inch$^2$ or 8*8 inch$^2$.

| The surface repair patch unit 405 may further include a first protective film 420 and a second protective film 425. In some aspects, the first and second protective films 420, 425 may be transparent acrylic adhesive films that may be disposed over and removably adhered to opposing surfaces of the unified integrated sheet 415. In other aspects, the first protective film 420 may be transparent and the second protective film 425 may be opaque (or vice-versa). Further, the first and second protective films 420, 425 may have same lengths and widths that may be in a range of 4 to 10 inches. In a preferred aspect, when the TPU sheet 205 and the deformable adhesive mesh sheet 210 (and hence the unified integrated sheet 415) have dimensions of 4*4 inch$^2$, the first and second protective films 420, 425 may have a length of 5.25 inches and a width of 4 inches.

The first protective film 420 may be disposed on non-adhesive surface of the unified integrated sheet 415, and may protect the non-adhesive surface from ambient environment. Further, the second protective film 425 may be disposed on the adhesive surface of the unified integrated sheet 415, and may protect the adhesive surface from ambient environment.

| In operation, the user 120 may remove the second protective film 425 from the surface repair patch unit 405 to expose the adhesive surface, may apply the surface repair patch unit 405 (e.g., the unified integrated sheet 415) to the surface 105 via the adhesive surface. Further, the user 120 may remove the first protective film 420 from the surface repair patch unit 405 to expose the non-adhesive surface, and may apply the drywall compound on the non-adhesive surface of the unified integrated sheet 415 when the first protective film 420 is removed and when the unified integrated sheet 415 is adhered to the surface 105.

In the aspect (not shown in FIG. 4) where the surface repair patch unit 405 has the TPU sheet 205 and the deformable adhesive mesh sheet 210 attached to each other (and not fused together), the first protective film 420 may be disposed on the mesh sheet exterior surface 215 and may protect the mesh sheet exterior surface 215 from ambient environment. Further, in this case, the second protective film 425 may be disposed on the TPU sheet 210 second surface and portions of mesh sheet interior surface that extend beyond the TPU sheet 210 second surface, and may protect respective surfaces from ambient environment.

The surface repair patch unit roll 410 may include an elongated surface repair patch unit that may be similar to the surface repair patch unit 405, however surface repair patch unit 405 length in this case may be considerably greater than surface repair patch unit 405 width. For example, in this case, the surface repair patch unit 405 width may be 4 inches, however the length may be 8 feet, 10 feet, 12 feet, or the like. Since the surface repair patch unit 405 is made of deformable and flexible sheets (e.g., the TPU sheet 205 and the deformable adhesive mesh sheet 210), the surface repair patch unit 405 may be easily rolled and packaged as the surface repair patch unit roll 410.

In this case, in operation, the user 120 may unroll the surface repair patch unit 405 from the surface repair patch unit roll 410 for a desired length, and may cut the surface repair patch unit 405 by using a pair of scissors. For example, if the user 120 desires to apply the surface repair patch unit 405 along an elongated damaged edge of drywall having a length of 12 inches, the user 120 may unroll 12 inches of the surface repair patch unit 405 from the surface repair patch unit roll 410 and may cut the required length by using a pair of scissors.

In some aspects, the surface repair patch unit roll 410 may also include the first and second protective films 420, 425. In this case as well, the user 120 may remove the first and second protective films 420, 425 from respective adhesive and non-adhesive surfaces of the surface repair patch unit 405, before using the surface repair patch unit 405 to repair the damaged portion 110.

Although FIG. 4 depicts examples where the surface repair patch unit 405 is square or rectangle-shaped, the present disclosure is not limited to these shapes. In some aspects, the surface repair patch unit 405 may have other shapes, e.g., circular, oval, pentagonal, hexagonal, etc.

Figure 5:
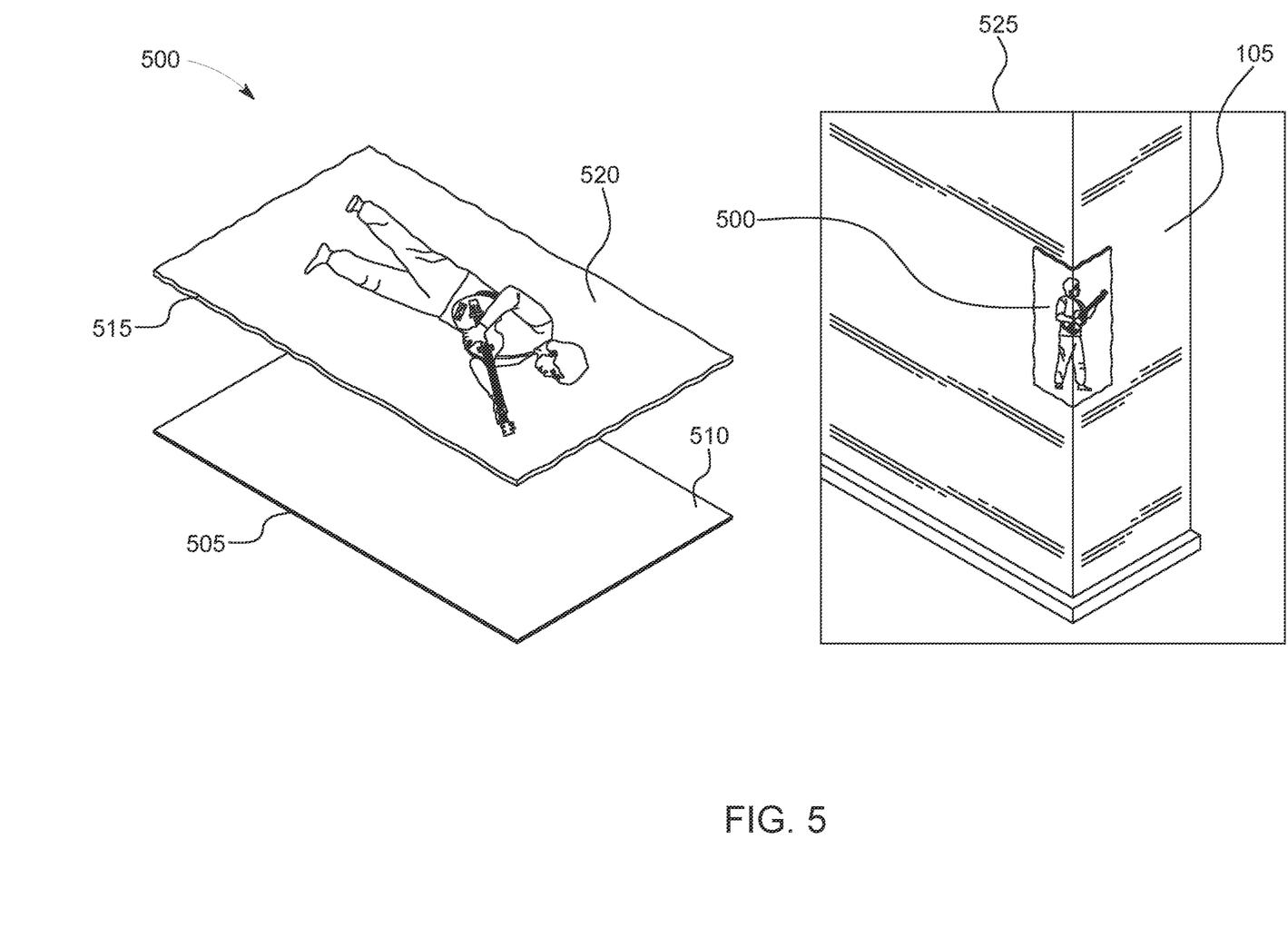
FIG. 5 depicts an example surface patch unit in accordance with the present disclosure.

FIG. 5 depicts an example surface patch unit 500 (or patch unit 500) in accordance with the present disclosure. The patch unit 500 may include a TPU sheet 505 that may be similar to the TPU sheet 205, and may have same or similar structural features as the TPU sheet 205. In some aspects, the TPU sheet 505 may have a greater thickness than the TPU sheet 205 thickness. For example, TPU sheet 505 thickness may be 1.5 to 4 times greater than the TPU sheet 205 thickness.

The TPU sheet 505 may include a first surface 510 and a second surface (e.g., an interior surface, not shown) opposite to the first surface 510. The second surface may include the adhesive material, and may be configured to be adhered to the surface 105 (e.g., over the damaged portion 110). In some aspects, the first surface 510 may be non-adhesive. In this case, the TPU sheet 505 may itself act as a surface repair patch (without requiring any deformable mesh sheet) and may directly adhere to the surface 105 by using the second surface. Further, in this case, the user 120 may apply drywall compound over the first surface 510 (i.e., the non-adhesive surface) when the TPU sheet 505 is adhered to the surface 105.

In other aspects, the first surface 510 too may include adhesive material. In this case, the patch unit 500 may additionally include a textile sheet 515 that may be attached (e.g., permanently affixed) to the first surface 510. The textile sheet 515 may include a textile exterior surface 520 and a textile interior surface (not shown) that may be opposite to the textile exterior surface 520. The textile sheet 515 may be attached to the first surface 510 via the textile interior surface. The textile sheet 515 may be made of, for example, cotton, silk, wool, linen, synthetic fibers such as rayon, nylon, polyester, and/or the like.

In some aspects, the textile sheet 515 may have water-repellant properties, so that the textile sheet 515 may not retain water. In other aspects, the textile sheet 515 may further include Hydrochromic ink, such that the textile sheet 515 may change color when the textile sheet 515 is wet.

The textile sheet 515 may have same dimensions (e.g., length and width) as the TPU sheet 505, or may have lesser or greater dimensions than TPU sheet 505 dimensions. Further, a textile sheet 515 thickness may be same as TPU sheet 505 thickness, or the textile sheet 515 thickness may be greater than the TPU sheet 505 thickness. In a preferred aspect, the textile sheet 515 thickness is greater than the TPU sheet 505 thickness. For example, the textile sheet 515 thickness may be in a range of 5 to 25 times greater than the TPU sheet 505 thickness.

In an exemplary aspect, the patch unit 500 may be adhered to surface or drywall corners, and the patch unit 500 may act as a childproof surface patch. Specifically, since the textile sheet 515 thickness is considerably greater than the TPU sheet 505 thickness, the patch unit 500 may provide "cushion" on the surface or drywall corners, and may thus act as a childproof surface patch. The textile exterior surface 520 may further include decorative pictures, images (e.g., action hero images, toy images, cartoon creature images, etc.) for aesthetic purposes.

In the aspect described above, the patch unit 500 may be applied over the damaged portion 110, and may also be applied to surfaces or corners that may not be damaged, however may be prone to repeated impacts (e.g., by users or children). The user 120 may adhere the patch unit 500 (including the thick textile sheet 515) to such surfaces to "child-proof" the surfaces. Further, since the textile sheet 515 includes Hydrochromic ink, the user 120 may get an indication when the textile sheet 515 (and hence the patch unit 500) may be wet. The user 120 may accordingly dry the surface/patch unit 500 (or take appropriate action) to avoid damage to the surface 105.

The patch unit 500 may additionally include the first and second protective films 420, 425 (not shown in FIG. 5) that may be removably adhered to opposing surfaces of the patch unit 500. As described above, the first and second protective films 420, 425 may protect respective patch unit 500 surfaces from ambient environment, and the user 120 may remove the first and second protective films 420, 425 from the patch unit 500 surface before adhering the patch unit 500 to the surface 105. A snapshot of the patch unit 500 adhered to the surface 105 is shown as view 525 in FIG. 5.

In additional aspects, the patch unit 500 may include one or more additional reinforcement sheets or layers (not shown) disposed between the textile sheet 515 and the TPU sheet 505. The reinforcement sheets or layers may be used to provide additional cushion to the childproof surface patch and increase patch unit 500 thickness. For example, the reinforcement sheets or layers may include layers of flexible plastic or foam.

In yet another aspect, the patch unit 500 may also include the deformable adhesive mesh sheet 210 attached to the TPU sheet 505, or include the unified integrated sheet 415 instead of the TPU sheet 505. In this case, the textile sheet and/or the reinforcement sheets may be attached to the deformable adhesive mesh sheet 210 or the unified integrated sheet 415.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc., should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A surface repair patch unit comprising:
    a deformable first sheet having a first sheet interior surface and a first sheet exterior surface, wherein the deformable first sheet is made of Thermoplastic Polyurethane (TPU); and
    a deformable second sheet attached with the deformable first sheet, wherein the deformable second sheet comprises an adhesive mesh sheet, wherein:
        the deformable second sheet comprises a second sheet interior surface and a second sheet exterior surface,
        the first sheet exterior surface is attached to the second sheet interior surface,
        the first sheet interior surface is configured to be adhered to a damaged surface,
        the deformable first sheet having the TPU is configured to directly contact the damaged surface, and
        wherein a coefficient of thermal expansion of the deformable first sheet is lower than respective coefficients of thermal expansion of the deformable second sheet and the damaged surface.

2. The surface repair patch unit of claim 1, wherein a deformable first sheet length is in a range of 4 to 8 inches, and wherein a deformable first sheet width is in a range of 4 to 8 inches.

3. The surface repair patch unit of claim 2, wherein the deformable first sheet length is less than a deformable second sheet length, and wherein the deformable first sheet width is less than a deformable second sheet width.

4. The surface repair patch unit of claim 1, wherein a deformable first sheet length is 4 inches, and wherein a deformable first sheet width is 4 inches.

5. The surface repair patch unit of claim 1, wherein the surface repair patch unit is packaged as a roll.

6. The surface repair patch unit of claim 1, wherein the deformable second sheet is made of fibrous material.

7. The surface repair patch unit of claim 6, wherein the fibrous material is fiberglass.

8. The surface repair patch unit of claim 1 further comprising a first protective film disposed on the first sheet interior surface and portions of the second sheet interior surface, wherein the first protective film is configured to protect the first sheet interior surface and the portions of the second sheet interior surface from ambient environment.

9. The surface repair patch unit of claim 1 further comprising a second protective film disposed on the second sheet exterior surface, wherein the second protective film is configured to protect the second sheet exterior surface from ambient environment.

10. The surface repair patch unit of claim 1, wherein the deformable first sheet has a memory such that the deformable first sheet may return to its original shape when the deformable first sheet is deformed.

11. A surface repair patch unit comprising:
    a deformable Thermoplastic Polyurethane (TPU) sheet; and
    a deformable adhesive mesh sheet fused with the TPU sheet to form a unified integrated sheet, and
    wherein the unified integrated sheet is configured to be adhered to a damaged surface.

12. The surface repair patch unit of claim 11, wherein a TPU sheet length is in a range of 4 to 8 inches, and wherein a TPU sheet width is in a range of 4 to 8 inches.

13. The surface repair patch unit of claim 11, wherein a TPU sheet length is 4 inches, and wherein a TPU sheet width is 4 inches.

14. The surface repair patch unit of claim 11, wherein the surface repair patch unit is packaged as a roll.

15. The surface repair patch unit of claim 11, wherein the deformable adhesive mesh sheet is made of fibrous material.

16. The surface repair patch unit of claim 15, wherein the fibrous material is fiberglass.

17. A patch unit comprising:
    a deformable Thermoplastic Polyurethane (TPU) sheet having adhesive material at a TPU sheet interior surface; and
    a textile sheet attached to a TPU sheet exterior surface, wherein a textile sheet thickness is greater than a TPU sheet thickness, and
    wherein the patch unit is configured to be adhered to a surface via the TPU sheet interior surface.

18. The patch unit of claim 17, wherein a TPU sheet length is in a range of 2 to 7 inches, and wherein a TPU sheet width is in a range of 4 to 8 inches.

19. The patch unit of claim 17 further comprising a reinforcement sheet disposed between the TPU sheet and the textile sheet.

* * * * *